US010382746B1

(12) United States Patent
Shapiro et al.

(10) Patent No.: US 10,382,746 B1
(45) Date of Patent: Aug. 13, 2019

(54) STEREOSCOPIC AUGMENTED REALITY HEAD-WORN DISPLAY WITH INDICATOR CONFORMING TO A REAL-WORLD OBJECT

(71) Applicant: Rockwell Collins, Inc., Cedar Rapids, IA (US)

(72) Inventors: Geoffrey A. Shapiro, Cedar Rapids, IA (US); Christopher L. George, Winchester, VA (US); Timothy J. Wittkop, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 180 days.

(21) Appl. No.: 14/861,716

(22) Filed: Sep. 22, 2015

(51) Int. Cl.
*H04N 13/332* (2018.01)
*G06T 19/00* (2011.01)
(Continued)

(52) U.S. Cl.
CPC ......... *H04N 13/332* (2018.05); *G06T 7/0057* (2013.01); *G06T 7/0075* (2013.01);
(Continued)

(58) Field of Classification Search
CPC .............. G02B 27/017; G02B 27/4227; G02B 27/0176; G02B 27/0179; G02B 27/283; G02B 27/0101; G02B 27/4205; G02B 27/42; G02B 2027/0178; G02B 2027/014; G02B 2027/0127; G02B 2027/0118; G02B 2027/0187; G02B 2027/0138; G02B 27/0172; G02B 27/0093; G02B 27/0105;
(Continued)

(56) References Cited

U.S. PATENT DOCUMENTS 5,726,916 A * 3/1998 Smyth ................. A61B 5/6814
351/210
8,497,784 B1 * 7/2013 Vandrovec ............ B64D 43/00
340/945
(Continued)

FOREIGN PATENT DOCUMENTS

WO        WO 9830981 A1 *  7/1998 ............. G06T 15/10

OTHER PUBLICATIONS

English Language Translation of WO 9830981 A1; Author: Matthias Hammer; Published Date: Jul. 16, 1998.*
(Continued)

*Primary Examiner* — Ibrahim A Khan
(74) *Attorney, Agent, or Firm* — Angel N. Gerdzhikov; Donna P. Suchy; Daniel M. Barbieri

(57) ABSTRACT

Head-worn displays are disclosed. A head-worn display may include at least one processor configured to determine a location of the head-worn display with respect to a real-world environment and to generate a conformal indicator conforming to an element in the real-world environment. The at least one processor may also be configured to generate a non-conformal indicator unconstrained by elements in the real-world environment. The head-worn display may include at least one display in communication with the at least one processor. The at least one display may be configured to display the conformal indicator and/or the non-conformal indicator generated by the at least one processor to a user.

17 Claims, 14 Drawing Sheets

(51) Int. Cl.
    *G06T 7/00*           (2017.01)
    *H04N 13/271*      (2018.01)
    *H04N 13/344*      (2018.01)
    *H04N 13/383*      (2018.01)

(52) U.S. Cl.
    CPC ......... *G06T 19/006* (2013.01); *H04N 13/271*
          (2018.05); *H04N 13/344* (2018.05); *H04N*
          *13/383* (2018.05); *G06T 2207/10021*
          (2013.01); *G06T 2207/10028* (2013.01); *G06T*
          *2207/20228* (2013.01); *G06T 2207/30181*
          (2013.01)

(58) Field of Classification Search
    CPC ............ G02B 27/0185; G02B 27/0132; G02B
            27/0123; G02B 27/0147; G02B 27/0134;
            G02B 27/0141; G02B 6/34; G02B 6/10;
            G06F 3/013; G06F 3/011; G06F 3/017;
            G06F 3/005; G06F 3/012; G06F 3/04815;
            G06F 3/0304; G06Q 30/02; G06Q
            30/0643; G06Q 30/0246; G06Q 30/0267;
            G06T 19/006; G06T 2200/04; G06T
            2219/024; G06T 2207/10004; G06K
            9/00671; H04N 13/044; H04N 13/0278;
            A63F 2300/8082; A61B 5/6803
    See application file for complete search history.

(56) References Cited

U.S. PATENT DOCUMENTS

| | | | | |
|---|---|---|---|---|
| 9,111,498 | B2* | 8/2015 | Border | G09G 3/3611 |
| 9,221,396 | B1* | 12/2015 | Zhu | B60Q 9/008 |
| 9,347,793 | B2* | 5/2016 | Meeker | G01C 23/00 |
| 9,648,313 | B1* | 5/2017 | Henry | H04N 13/044 |
| 2003/0127557 | A1* | 7/2003 | Anderson | G01C 23/00 |
| | | | | 244/1 R |
| 2003/0232649 | A1* | 12/2003 | Gizis | A63F 13/12 |
| | | | | 463/40 |
| 2004/0044152 | A1* | 3/2004 | Matyjaszewski | C08F 2/10 |
| | | | | 526/91 |
| 2005/0264529 | A1* | 12/2005 | Morgan | G06F 3/0202 |
| | | | | 345/160 |
| 2006/0238877 | A1* | 10/2006 | Ashkenazi | G02B 27/0093 |
| | | | | 359/630 |
| 2010/0026525 | A1 | 2/2010 | Feyereisen et al. | |
| 2011/0022291 | A1 | 1/2011 | He | |
| 2012/0120070 | A1 | 5/2012 | Baillot | |
| 2013/0169560 | A1* | 7/2013 | Cederlund | G06F 3/013 |
| | | | | 345/173 |
| 2014/0240313 | A1* | 8/2014 | Varga | G06T 19/006 |
| | | | | 345/419 |
| 2014/0267270 | A1* | 9/2014 | Pappoppula | G06T 15/60 |
| | | | | 345/426 |
| 2014/0361956 | A1* | 12/2014 | Mikhailov | H04N 13/0271 |
| | | | | 345/8 |
| 2015/0049013 | A1* | 2/2015 | Rahman | G06F 3/013 |
| | | | | 345/156 |
| 2015/0331485 | A1* | 11/2015 | Wilairat | G02B 27/0172 |
| | | | | 345/156 |
| 2016/0019808 | A1* | 1/2016 | Chavez | G09B 9/302 |
| | | | | 434/38 |

OTHER PUBLICATIONS

U.S. Appl. No. 13/971,695, filed Aug. 20, 2013, Brian R. Roggendorf.
Pew, NASA's Head-Worn Display, Mar. 14, 2012, 1 page.
Vuzix, Star 1200XLD See-Through AR Eyewear System, www.vuzix.com/augmented-reality/products_star1200xld.html, retrieved on Aug. 12, 2013, 4 pages.

* cited by examiner

STEREOSCOPIC AUGMENTED REALITY HEAD-WORN DISPLAY WITH INDICATOR CONFORMING TO A REAL-WORLD OBJECT

BACKGROUND

A head-worn display (or a head-mounted display) is a display device worn on the head of a user. A head-worn display may include one or more display optics positioned in the field of view of one or both eyes of the user. A head-worn display having display optics positioned in the fields of view of both eyes of the user may be referred to as a stereoscopic head-worn display.

SUMMARY

In one aspect, embodiments of the inventive concepts disclosed herein are directed to a head-worn display. The head-worn display may include at least one processor configured to determine a location of the head-worn display with respect to a real-world environment and to generate a conformal indicator conforming to an element in the real-world environment. The head-worn display may also include at least one display in communication with the at least one processor. The at least one display may be configured to display the conformal indicator generated by the at least one processor to a user.

In a further aspect, embodiments of the inventive concepts disclosed herein are directed to a head-worn display. The head-worn display may include at least one processor configured to determine a location of the head-worn display with respect to a real-world environment and to generate a conformal indicator conforming to an element in the real-world environment. The head-worn display may also include a stereoscopic display in communication with the at least one processor. The stereoscopic display may be configured to display the conformal indicator generated by the at least one processor to a user, wherein the conformal indicator is displayed at a stereoscopic depth conforming to the element in the real-world environment.

In another aspect, embodiments of the inventive concepts disclosed herein are directed to a head-worn display. The head-worn display may include at least one processor configured to: determine a location of the head-worn display with respect to a real-world environment; generate a conformal indicator conforming to an element in the real-world environment; and generate a non-conformal indicator unconstrained by elements in the real-world environment. The head-worn display may also include a stereoscopic display in communication with the at least one processor. The stereoscopic display may be configured to display the conformal indicator and the non-conformal indicator generated by the at least one processor to a user, wherein the conformal indicator may be displayed at a stereoscopic depth conforming to the element in the real-world environment, and wherein the non-conformal indicator may be displayed at an adjustable stereoscopic depth.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to augmented reality head-worn displays. Referring generally to FIGS. 1-13, a series of diagrams illustrating augmented reality depictions that may be presented to a user (e.g., an aircraft pilot) using an exemplary head-worn display 100 configured in accordance with the inventive concepts disclosed herein is shown.

Figure 1:
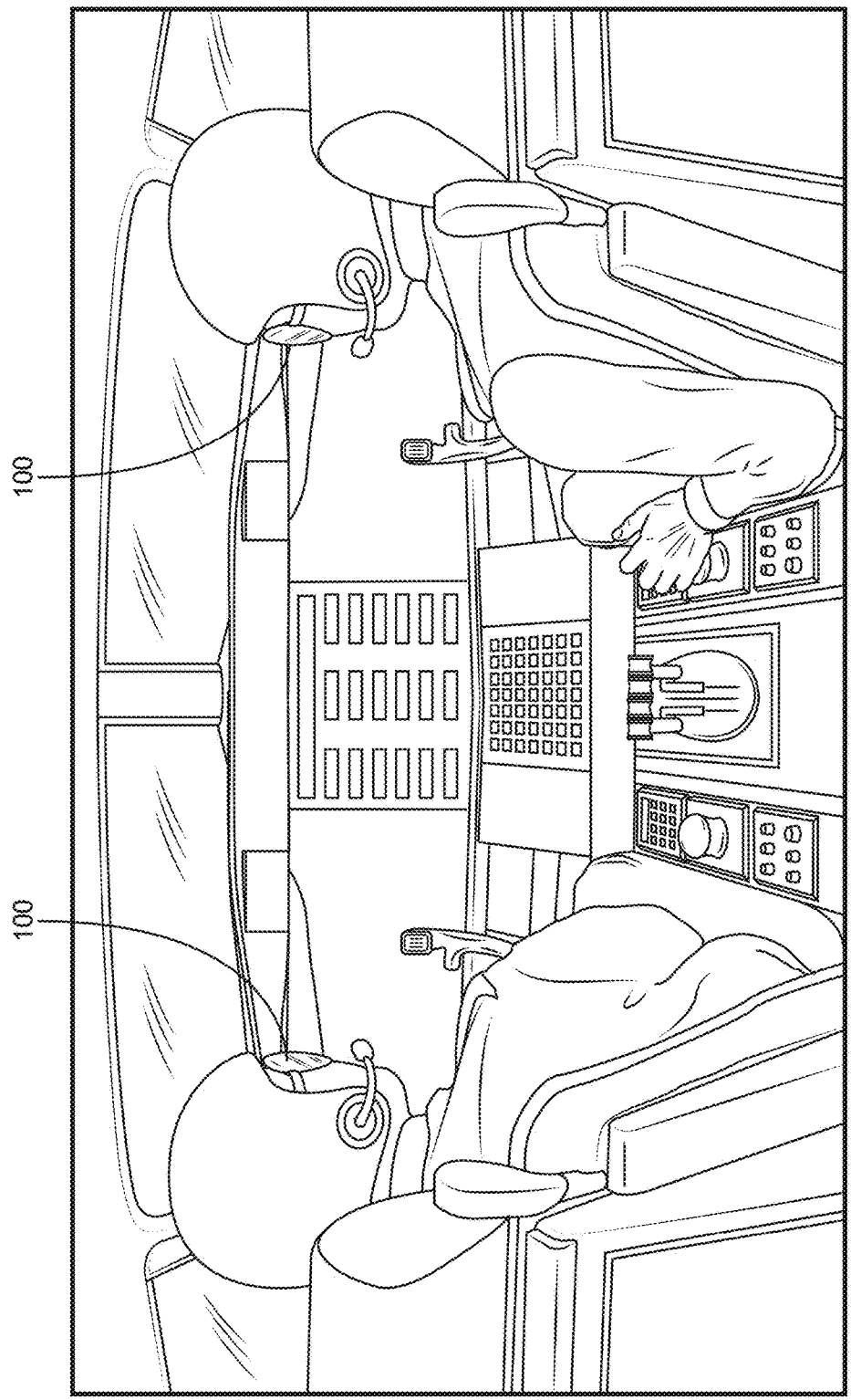
FIG. 1 is an illustration depicting head-worn displays configured to be utilized inside an aircraft.
Figure 2:
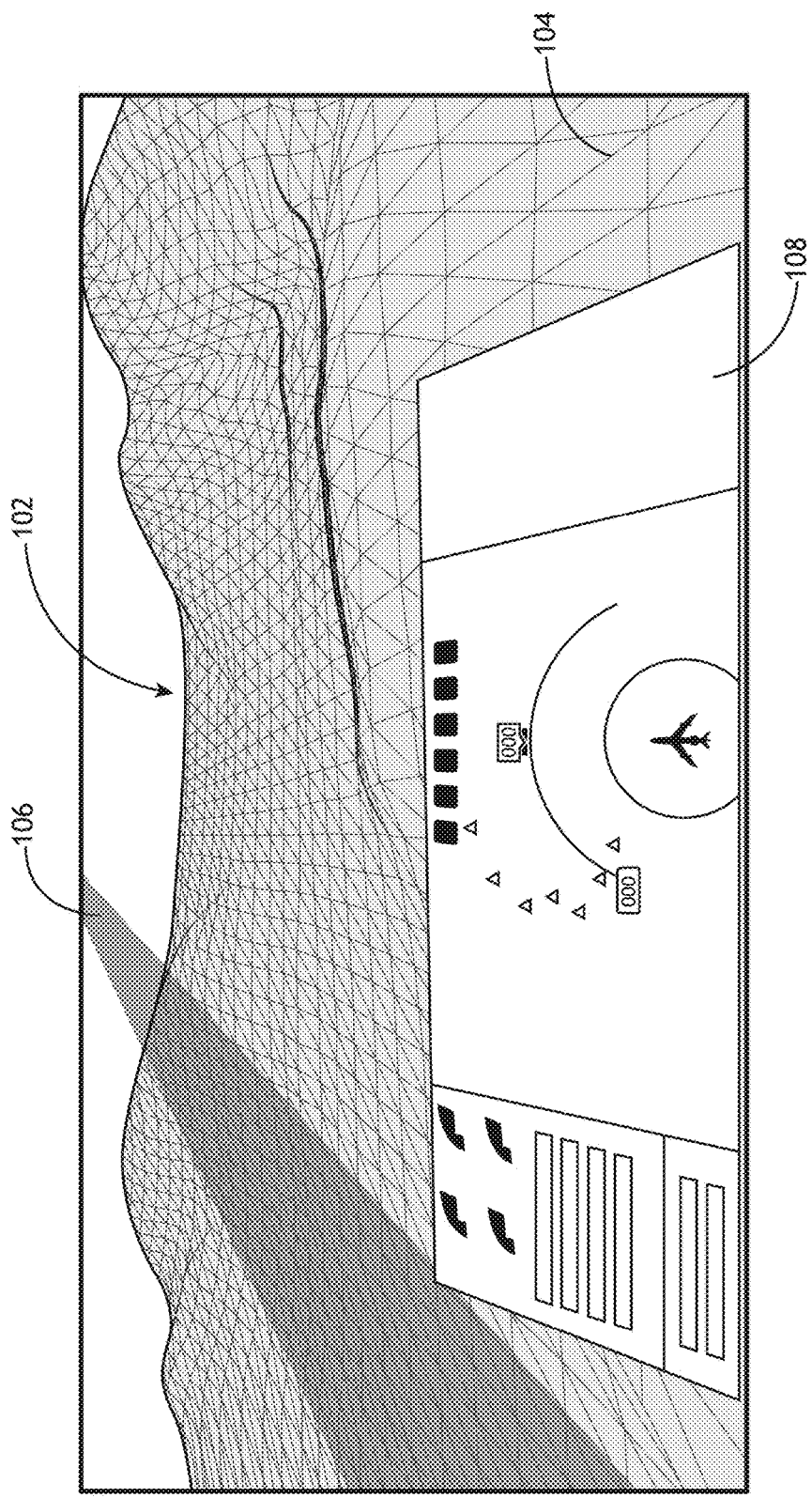
FIG. 2 is an illustration depicting an augmented reality depiction provided by a head-worn display according to an exemplary embodiment of the inventive concepts disclosed herein.

The term "augmented reality" refers to a live view of a physical, real-world environment whose elements may be augmented (or supplemented) by computer-generated graphics or data input. For instance, as shown in FIG. 2, a pilot may be able to view the real-world environment 102 through the head-worn display 100. It is noted that the real-world environment may be viewed directly, where the head-worn display 100 may utilize a substantially transparent display substrate that allows the pilot to see the real-world environment 102 through the transparent display substrate. Alternatively, the real-world environment 102 may be provided to the pilot indirectly, where the head-worn display 100 may utilize one or more cameras to obtain live views of the real-world environment 102 and display the live views to the pilot via the head-worn display 100. It is contemplated that a head-worn display 100 configured in accordance with the inventive concepts disclosed herein may implement either approach without departing from the broad scope of the inventive concepts disclosed herein.

Figure 3:
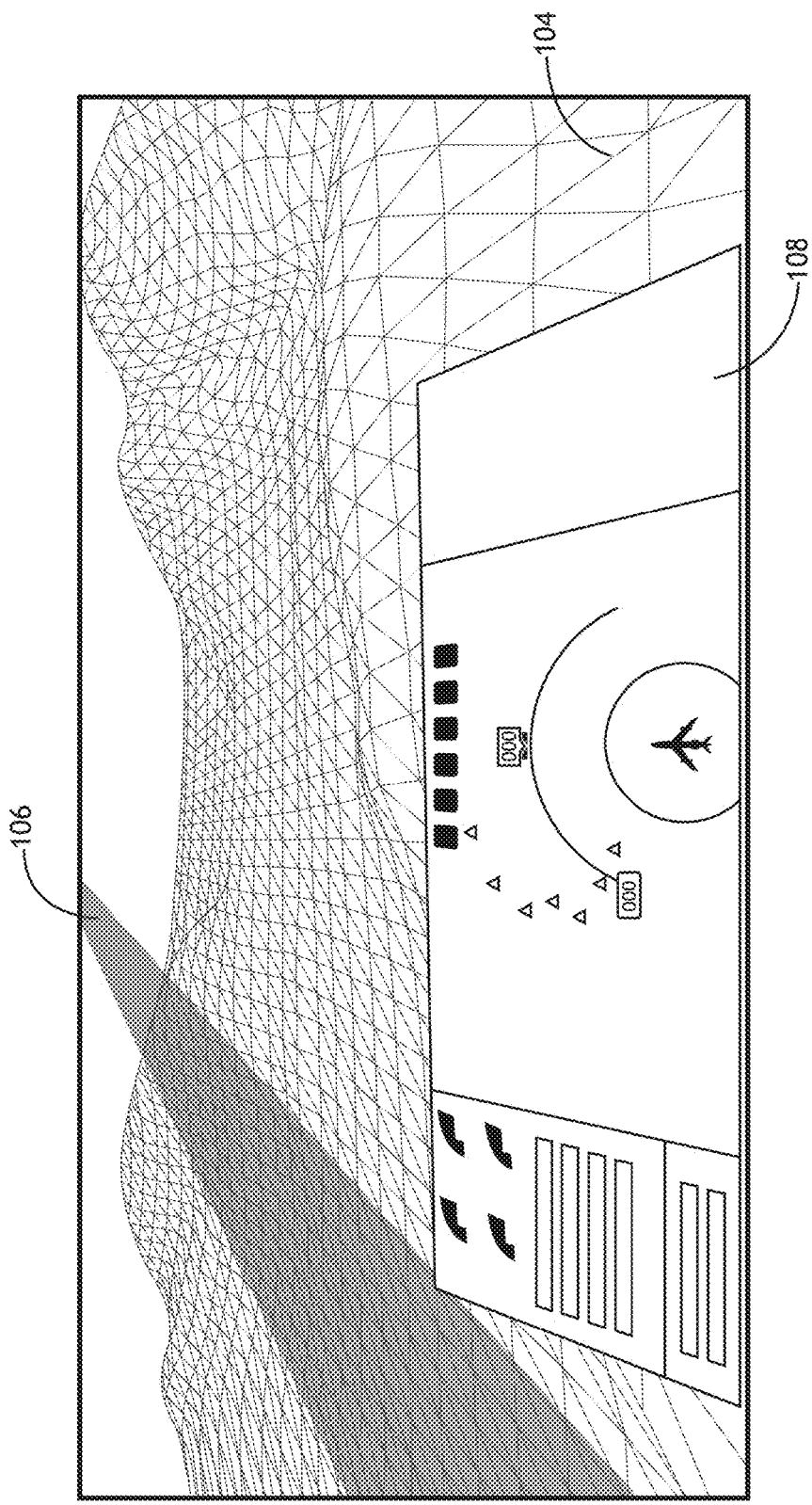
FIG. 3 is an illustration depicting an augmented reality depiction provided by the head-worn display during low visibility situations.
Figure 4:
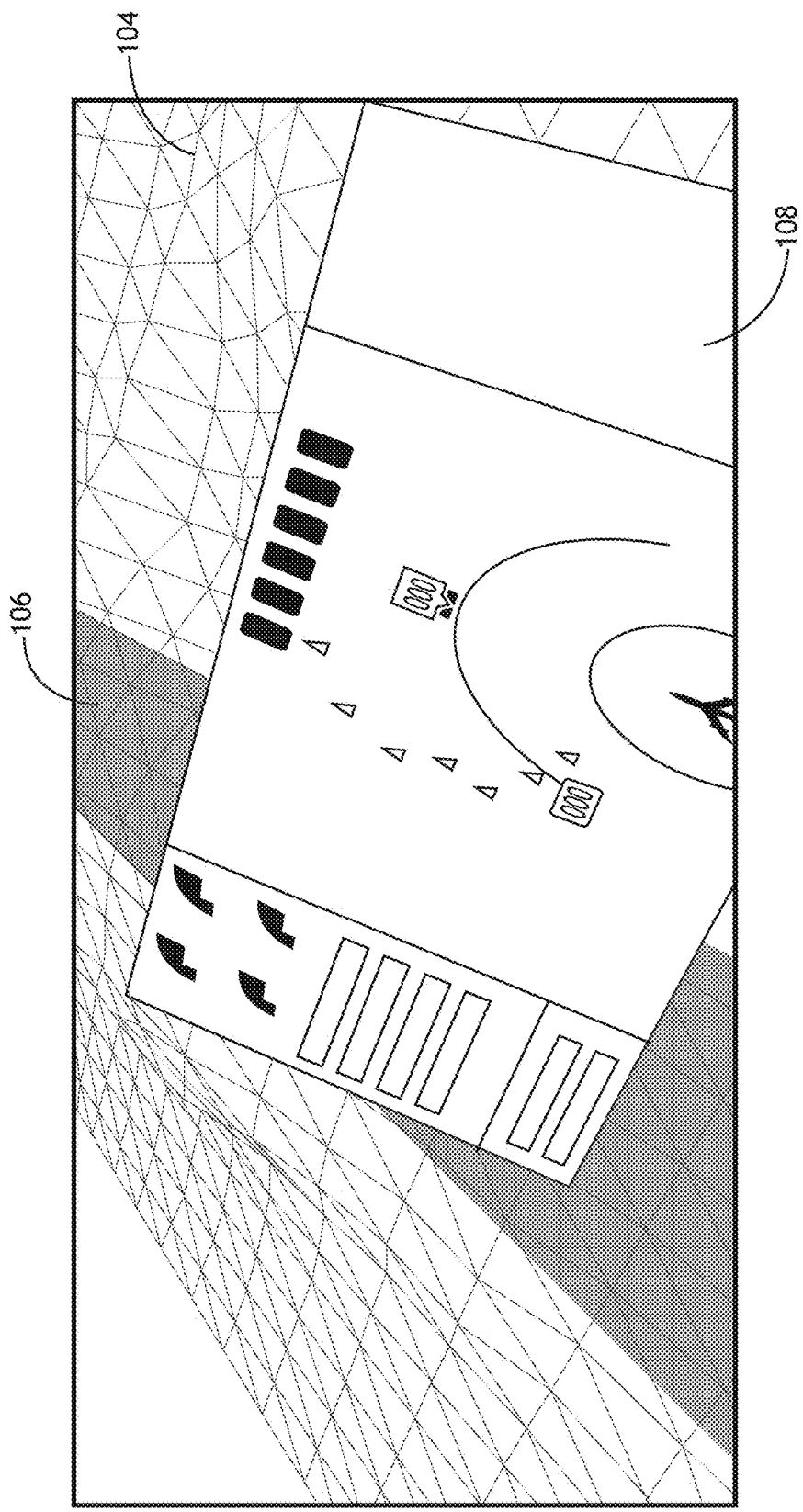
FIG. 4 is an illustration depicting an augmented reality depiction provided by the head-worn display, wherein a virtual panel is rendered to appear at a fixed location.
Figure 5:
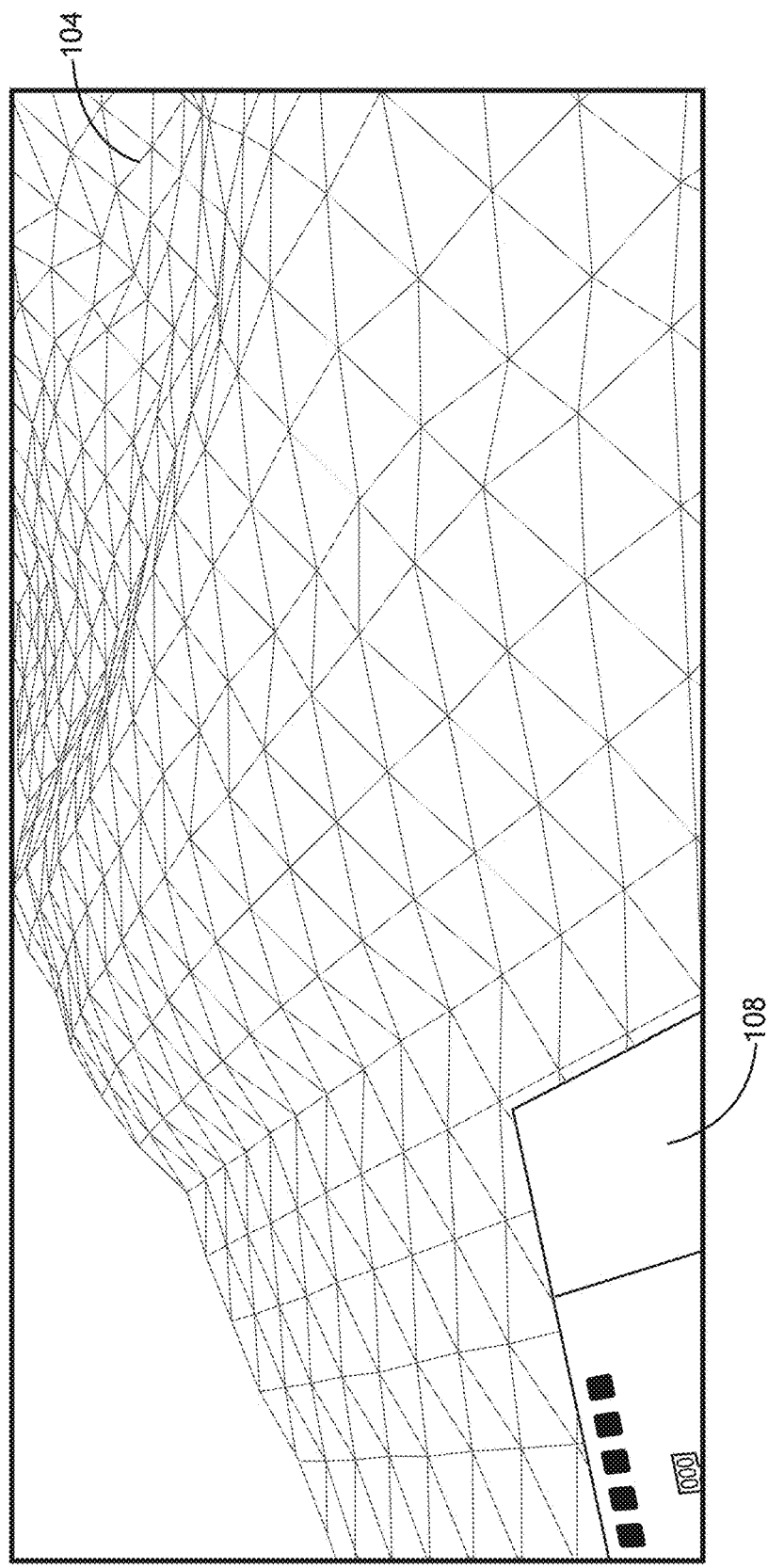
FIG. 5 is another illustration depicting an augmented reality depiction provided by the head-worn display, wherein the virtual panel is rendered to appear at the fixed location.

Also shown in FIG. 2 are some exemplary graphics/data elements 104, 106, and 108 that may be generated by the head-worn display 100. For example, a computer-generated graphical depiction 104 of the real-world environment 102 may be displayed to provide supplemental information about the real-world environment 102. The graphical depiction 104 may include, for example, one or more wireframe maps, topographic maps, territorial boundaries, flight restriction indicators, obstacle indicators, airport indicators, landing pad indicators, wind direction indicators, traffic, weather radar returns (e.g., weather, ground mapping, turbulence, lightning), and sensor information including enhanced vision sensors as well as other types of indicators that may help the pilot better understand the real-world environment 102. It is noted that in certain instances, the graphical depiction 104 of the real-world environment 102 may be more informative than the pilot's own visual of the real-world environment 102, especially when operating at night or during low visibility situations (as shown in FIG. 3).

It is contemplated that the head-worn display 100 may utilize a variety of techniques to correlate the graphical depiction 104 with the real-world environment 102 to increase the integrity of the augmented reality depiction. For instance, by determining the position/orientation of the aircraft (e.g., using various positioning systems available on the aircraft) and the position/orientation of the head-worn display 100 (e.g., using one or more head trackers that can track the head position of the pilot) relative to the aircraft, the head-worn display 100 may be able to generate a simulated view that precisely depicts the real-world environment 102 from the perspective of the pilot. This simulated view may be further processed to provide a stereoscopic view (having slightly different renderings for the left and the right eyes), which may then be displayed using the head-worn display 100 to augment the pilot's view of the real-world environment 102. It is noted that because stereoscopic views are not readily presentable in the accompanying figures, only two-dimensional representations of such stereoscopic views are provided in FIGS. 2-13. It is contemplated that the two-dimensional representations provided in FIGS. 2-13 are merely exemplary and are not meant to be limiting.

It is also contemplated that the head-worn display 100 may provide other types of computer-generated graphical depictions in addition to the graphical depictions 104 described above. For example, the head-worn display 100 may be configured to provide a graphical depiction of a flight path 106 and one or more virtual panels 108.

It is noted that the virtual panel 108 may be designed to simulate one or more conventional control/display panels (e.g., multi-function displays) that the pilot may be familiar with. It is also noted that the virtual panel 108 may be designed to be customizable, providing the pilot abilities to modify the layout and/or functionalities provided by the virtual panel 108. It is further noted that the virtual panel 108 may be configured to support one or more means of data input. For example, the virtual panel 108 may be controlled using voice command or speech recognition. Alternatively and/or additionally, the virtual panel 108 may behave as a virtual touch screen that can be controlled using hand tracking or gesture recognition. In another example, eye tracking techniques may be utilized to allow the pilot to control the position of a cursor using his/her eyes and then use a selector (e.g., a button, a voice command or the like) to execute an operation based on the position of the cursor. Eye tracking techniques may also be utilized to enable automatic calibration of the head-worn display 100 and zooming operations, where the center point of the zooming operation may be determined based on the detected eye position. It is to be understood that the virtual panel 108 may be configured to support other means of data input without departing from the broad scope of the inventive concepts disclosed herein.

It is also to be understood that the virtual panel 108 may be fixed to a particular location to simulate a behavior that is consistent with conventional fight deck multi-function displays. For instance, as shown in FIGS. 2 and 3, the virtual panel 108 may appear to be centrally located when the pilot is looking down at the flight deck in the direction of travel. However, as the pilot turns his/her head to the left (FIG. 4) or to the right (FIG. 5), the virtual panel 108 may stay at its original position instead of following the pilot's head movements. It is contemplated that an option may be provided to the pilot to either enable or disenable locking of the virtual panel 108.

Also shown in FIGS. 2-5 is another optional feature that may enhance the viewing experience of the virtual panel 108 when enabled. More specifically, it is noted that the virtual panel 108 may be configured to always face the pilot at a predetermined viewing angle with respect to the pilot's line of sight. For instance, the virtual panel 108 may always be rendered normal to the pilot's line of sight, which may be appreciated in various operating conditions.

Figure 6:
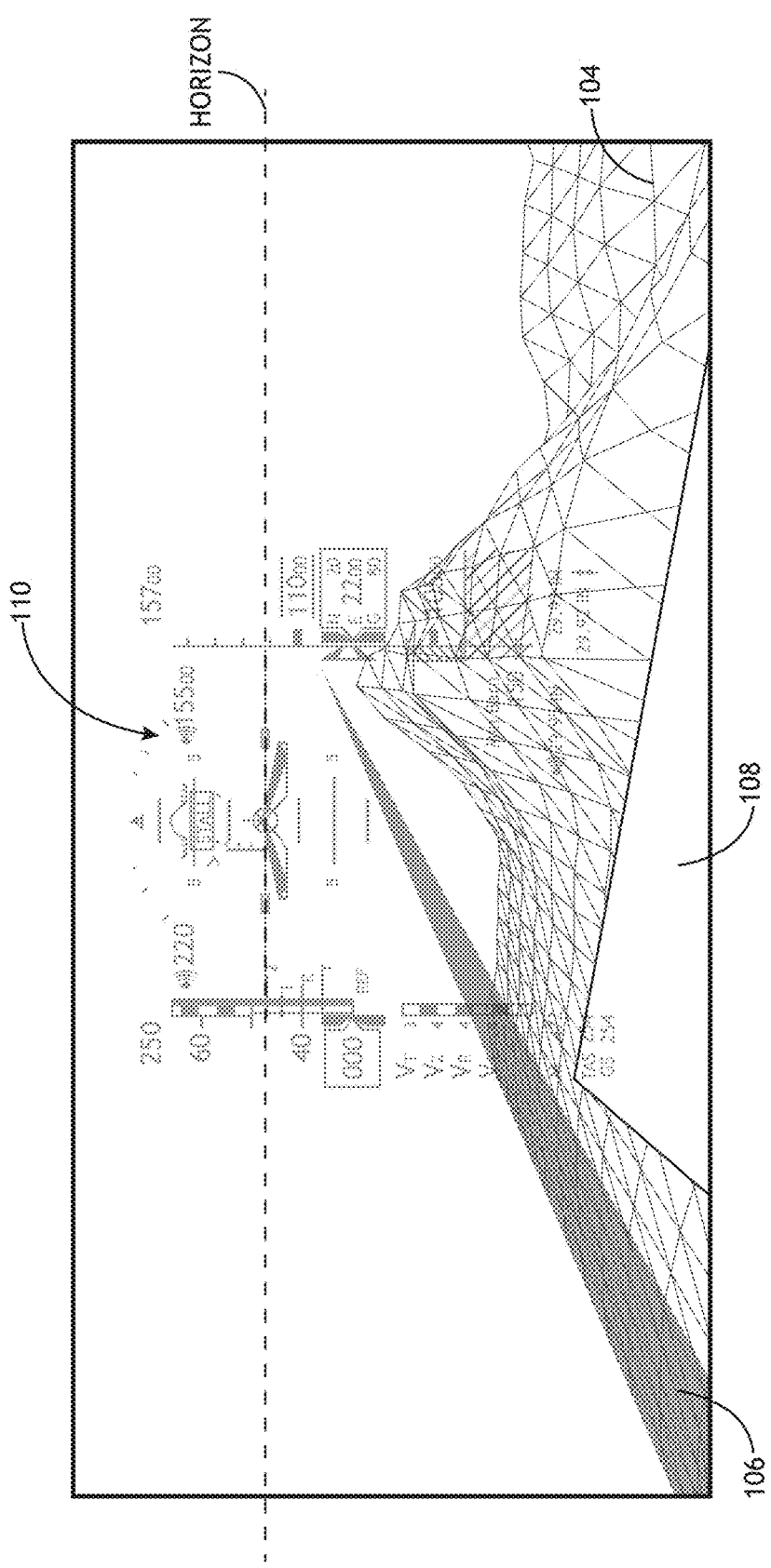
FIG. 6 is an illustration depicting an augmented reality depiction provided by the head-worn display, wherein a primary flight display is conditionally engaged.
Figure 7:
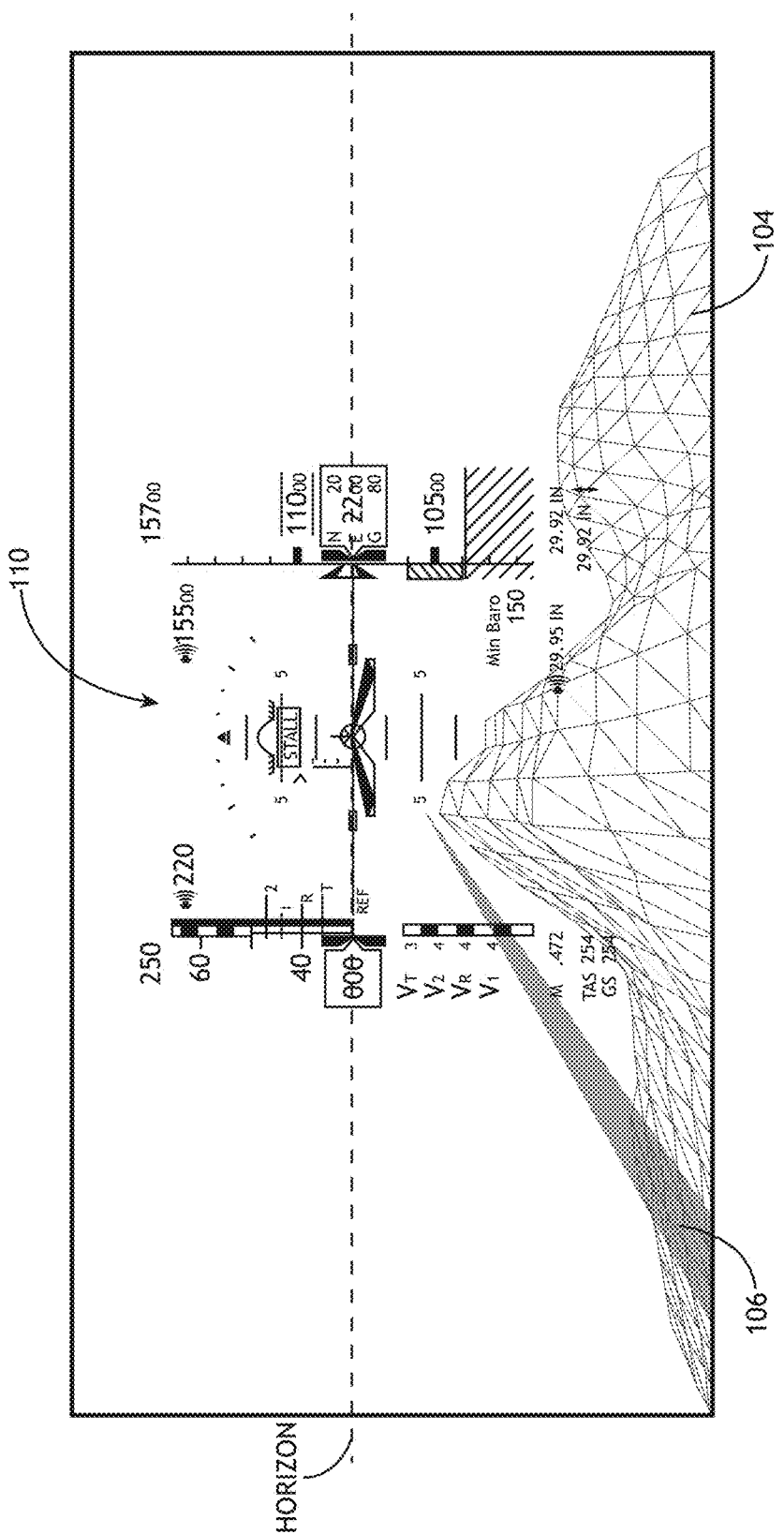
FIG. 7 is another illustration depicting an augmented reality depiction provided by the head-worn display, wherein the primary flight display is conditionally engaged.

It is contemplated that certain head-worn displays 100 configured in accordance with the inventive concepts disclosed herein may be further configured to provide a primary flight display (PFD). As shown in FIG. 6, the PFD 110 may start to appear as the pilot starts to lift his/her head up and look away from the virtual panel 108. It is noted that the PFD 110 may include an attitude indicator, which may give the pilot information about the aircraft's pitch and roll characteristics as well as the orientation of the aircraft with respect to the horizon. In certain implementations, the horizon represented in the PFD 110 may conform to the actual horizon (as it would be seen by the pilot). As the pilot continues to lift his/her head up (as shown in FIG. 7), the position of the horizon represented in the PFD 110 may be adjusted accordingly.

It is to be understood that the PFD 110 may be configured to display other types of indictors as well. For example, the PFD 110 may include an airspeed indicator, an altitude indicator, a vertical speed indicator, and/or a heading indicator. It is to be understood that the list of indicators that may be provided by the PFD 110 is merely exemplary and is not meant to be limiting. It is contemplated that the specific layout of the PFD 110 may vary without departing from the broad scope of the inventive concepts disclosed herein.

Figure 8:
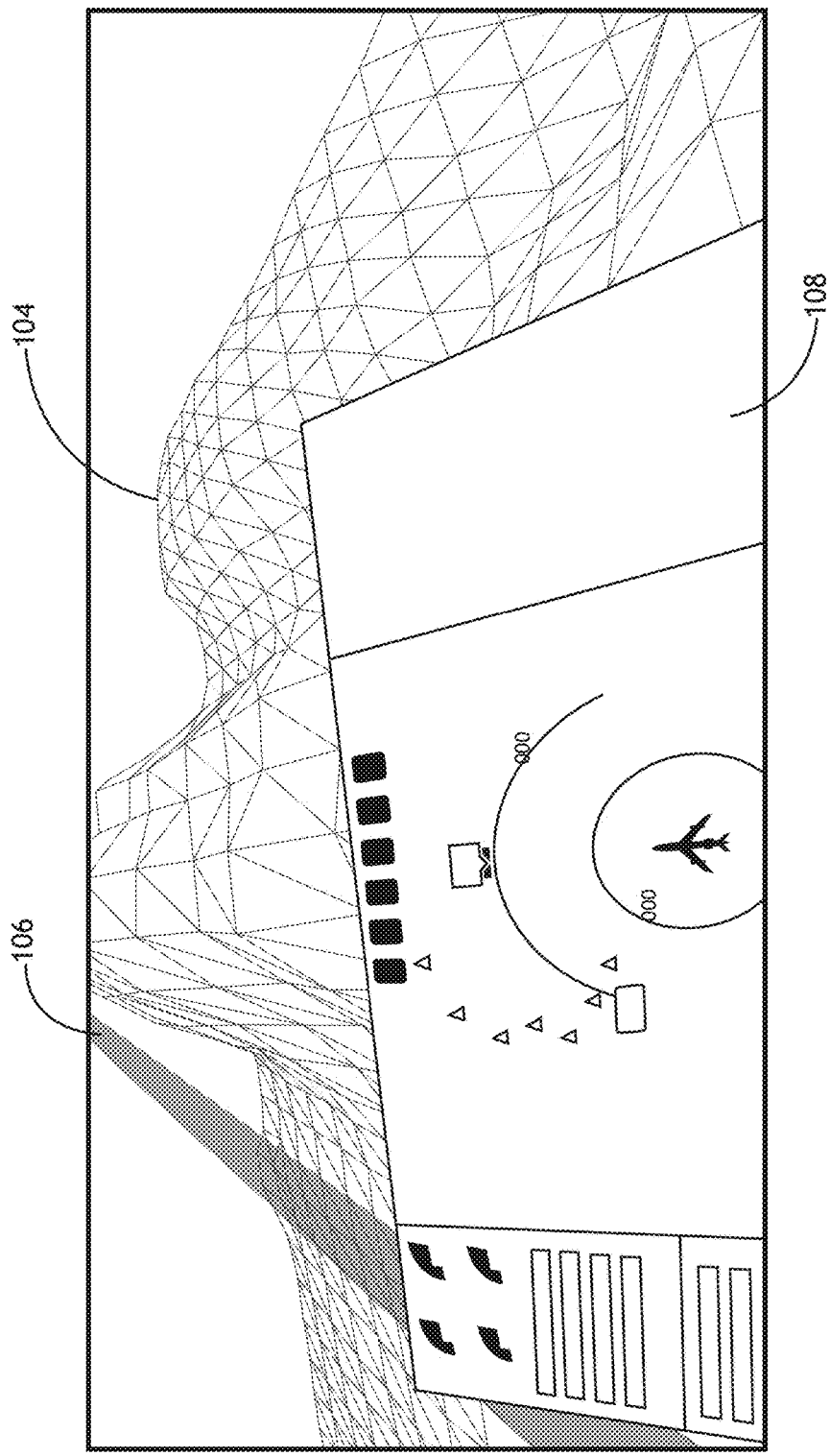
FIG. 8 is an illustration depicting an augmented reality depiction provided by the head-worn display, wherein the primary flight display is conditionally disengaged.

It is contemplated that the PFD 110 may be disengaged manually and/or automatically. For instance, the PFD 110 may be manually disengaged in response to a user-initiated command. Alternatively and/or additionally, the PFD 110 may be conditionally disengaged when it is determined that the PFD 110 is interfering with what the pilot intends to see. For example, the PFD 110 may be disengaged when the pilot starts to look down into the flight deck (as shown in FIG. 8), which may indicate that the pilot intends to see the virtual panel 108 (or other instruments provided within the cockpit) instead of the PFD 110. The PFD 110 may also be disengaged when the pilot turns toward the direction of his/her co-pilot, or turns toward any direction that may be defined to conditionally disengage the PFD 110.

It is contemplated that various other techniques may also be utilized to help determine whether to conditionally disengage the PFD 110. For instance, face recognition or other detection techniques may be utilized to recognize a situation where the pilot intends to see an object different from the PFD 110, which may prompt the head-worn display 100 to temporarily disengage the PFD 110. It is to be understood that other detection techniques may also be utilized to help make the determination without departing from the broad scope of the inventive concepts disclosed herein. For example, if the PFD 110 appears to overlap with the virtual panel 108, and if the virtual panel 108 is deemed more important than the PFD 110 should they overlap, the PFD 110 may be disengaged accordingly when an overlap occurs. It is to be understood that similar techniques may be utilized in reversed manners to help determine whether and when to conditionally engage the PFD 110 without departing from the broad scope of the inventive concepts disclosed herein.

It is contemplated that, in certain implementations, the head-worn display 100 may be further configured to communicate with various types of sensors and/or detection devices (e.g., radars) onboard the aircraft, providing the head-worn display 100 abilities to receive and display additional information regarding the real-world environment 102. For instance, the head-worn display 100 may be configured to receive weather information in real-time, and if a particular weather pattern is of a concern, an alert (which may include data indicating its position, movement, intensity and the like) may be displayed at a location that correlates with that particular weather pattern in the real-world. Similarly, the head-worn display 100 may receive information regarding an object (e.g., a landing destination, an obstacle, an oil platform, a search and rescue target or the like) from one or more radars (e.g., the weather radar or the like) onboard the aircraft, cross-reference the received information with information obtained from other sensors (e.g., location sensors or the like) if available, and display an indicator or symbology to help the pilot locate the object with improved data reliability. The head-worn display 100 may also be configured to receive traffic information from one or more detection/communication devices in real-time and display an alert (which may also include data indicating its position, direction, speed and the like) that correlates with a traffic of concern.

Figure 9:
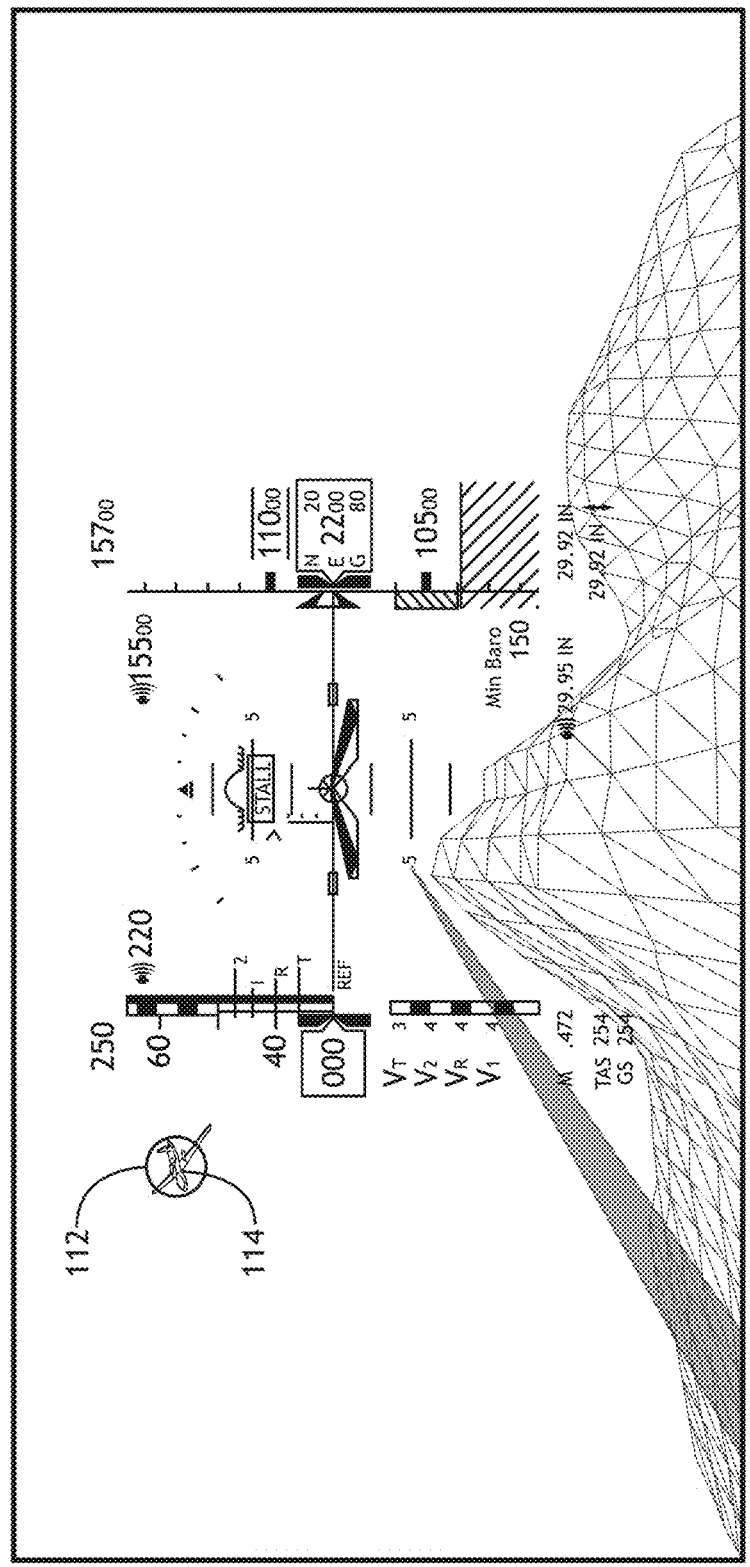
FIG. 9 is an illustration depicting an augmented reality depiction provided by the head-worn display, wherein an alert is displayed.

FIG. 9 is an illustration depicting an exemplary alert 112 that may be provided by the head-worn display 100 to identify an object of concern 114 (e.g., a flying object, a weather pattern or the like). It is to be understood that the alert 112 may be displayed in various different manners without departing from the broad scope of the inventive concepts disclosed herein. For instance, the alert 112 may be displayed in a particular color or at a particular brightness setting. Additionally and/or alternatively, the head-worn display 100 may take advantages of the stereoscopic nature of the view and present the alert 112 at a particular depth (e.g., rendering the alert 112 as a three-dimensional element) to visually indicate the importance of the alert 112.

Figure 10:
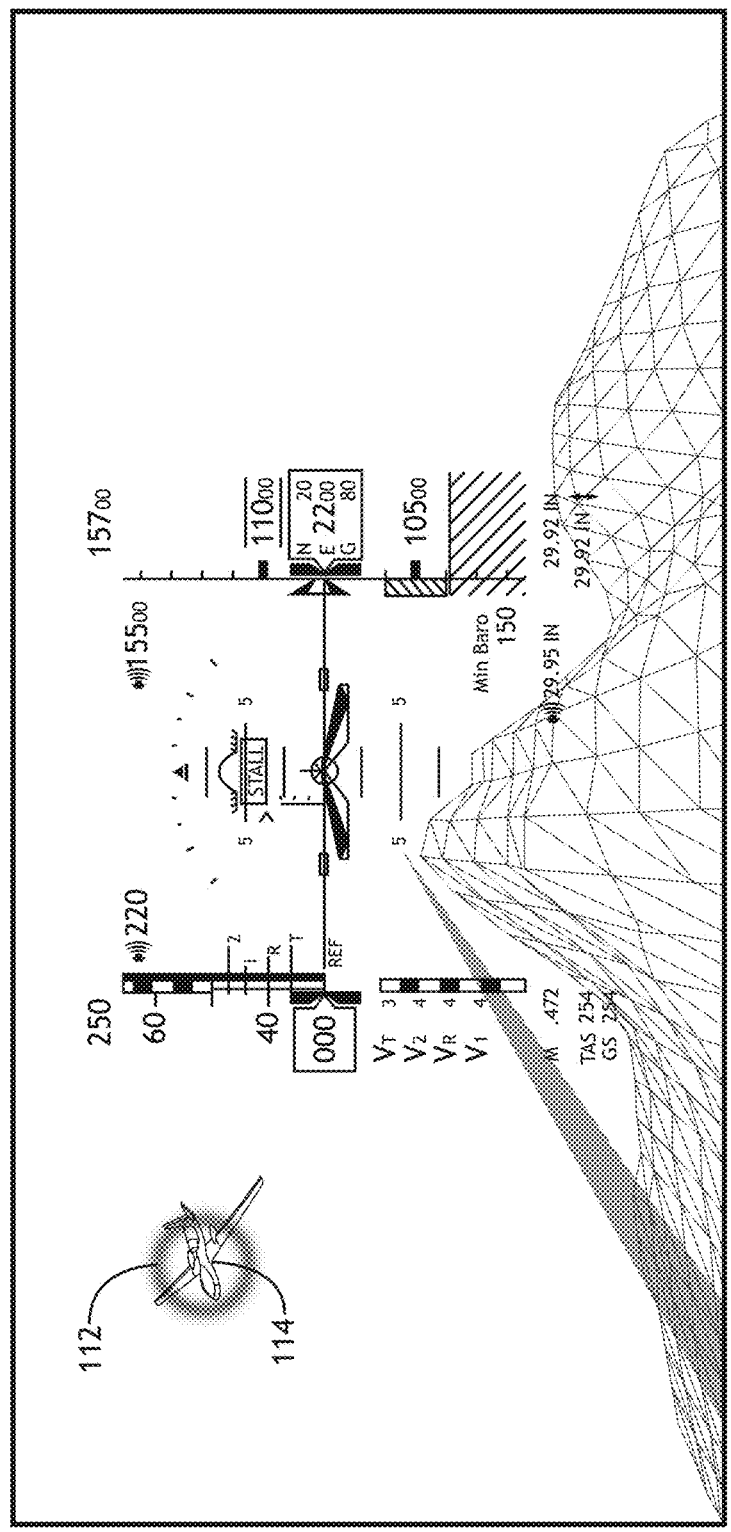
FIG. 10 is an illustration depicting an augmented reality depiction provided by the head-worn display, wherein the alert is displayed at varying stereoscopic depths.

It is contemplated that other techniques may also be utilized to visually indicate the importance of the alert 112. For example, the alert 112 may be associated with a movement (e.g., in the x-, y-, and/or z-direction) to act as a rapid attention gathering mechanism. As shown in FIGS. 9 and 10, the depth of the alert 112 (as it appears in a three-dimensional space) may change, which in turn may draw the attention of the pilot. In another example, shadows may be added to the alert 112 and/or the object of concern 114 to provide additional cue of depth and/or altitude. It is contemplated that other two-dimensional and/or three-dimensional visual effects not explicitly mentioned above may also be utilized to visually indicate the importance of the alert 112 without departing from the broad scope of the inventive concepts disclosed herein.

It is also to be understood that similar visual effects may be applicable to other display elements provided by the head-worn display 100 without departing from the broad scope of the inventive concepts disclosed herein. For example, if it is determined that the aircraft is flying too close to the ground or too close to a restricted area, one or more relevant portions of the graphical depiction 104 (e.g., the wireframe as depicted in the figures) may be associated with one or more visual effects to indicate the potentially dangerous situation. Similarly, if it is determined that the aircraft is flying too fast, for example, the airspeed indicator of the PFD 110 may be associated with one or more visual effects to alert the pilot.

It is further contemplated that the head-worn display 100 may also take advantages of the stereoscopic nature of the view for de-cluttering purposes. For instance, referring back to the PFD 110 shown in FIGS. 6 and 7, while the horizon indicator represented in the PFD 110 may conform to the actual horizon (such an indicator may be referred to as a conformal indicator), some other indicators represented in the PFD 110 may be unconstrained by real-world elements, and they may be referred to as non-conformal indicators. In certain implementations, conformal and non-conformal indicators may be displayed at different stereoscopic depths to help reduce clutter.

More specifically, conformal indicators (e.g., including the horizon indicator and the wireframe map) may have stereoscopic depth settings that match their real-world counterpart. For instance, the horizon indicator provided by the PFD 110 may be presented at infinity and the wireframe representation of a mountain may be presented at a stereoscopic depth that appears to conform to the relative distance from the mountain to the aircraft. Non-conformal indicators, on the other hand, may be displayed at stereoscopic depth settings that are not necessarily tied to any real-world elements. For instance, one or more non-conformal indicators (e.g., the virtual panel 108) may be presented at a stereoscopic depth that is much closer than infinity. It is contemplated that presenting conformal and non-conformal indicators in this manner may be appreciated because humans have a natural ability to filter items that are not presented in the depth (focal) plane of our eyes, yielding the feeling of a less cluttered display without actually removing any display elements.

It is also contemplated the stereoscopic depth of non-conformal indicators may be configured to be adjustable in certain implementations. For instance, suppose that an altitude indicator is typically presented at a stereoscopic depth that is much closer than infinity, meaning that the altitude indicator may not be clearly visible to the pilot if the pilot is searching for an airport at a distance (i.e., the focal plane of the eyes of the pilot is at a distance). Now suppose that the altitude of the aircraft has dropped below a certain level that requires immediate attention from the pilot, the stereoscopic depth of the altitude indicator may be adjusted to match the focal plane of the eyes of the pilot (which can be detected using one or more sensor(s) positioned with in the head-worn display 100), providing an effective mechanism to bring the altitude indicator into focus and to quickly draw the attention from the pilot.

It is to be understood that the head-worn display 100 may take advantages of the stereoscopic nature of the view to provide other display features as well. For example, in certain implementations, information regarding traffic, weather, terrain and the like may be presented in a stereoscopic (or layered) map to give an additional perspective to conventional two-dimensional maps. In another example, a stereoscopic (or three-dimensional) route map may be provided to show waypoints at their corresponding altitudes. It is contemplated that the stereoscopic nature of the head-worn display 100 may be utilized to provide other display features not specifically described above without departing from the broad scope of the inventive concepts disclosed herein.

Figure 11:
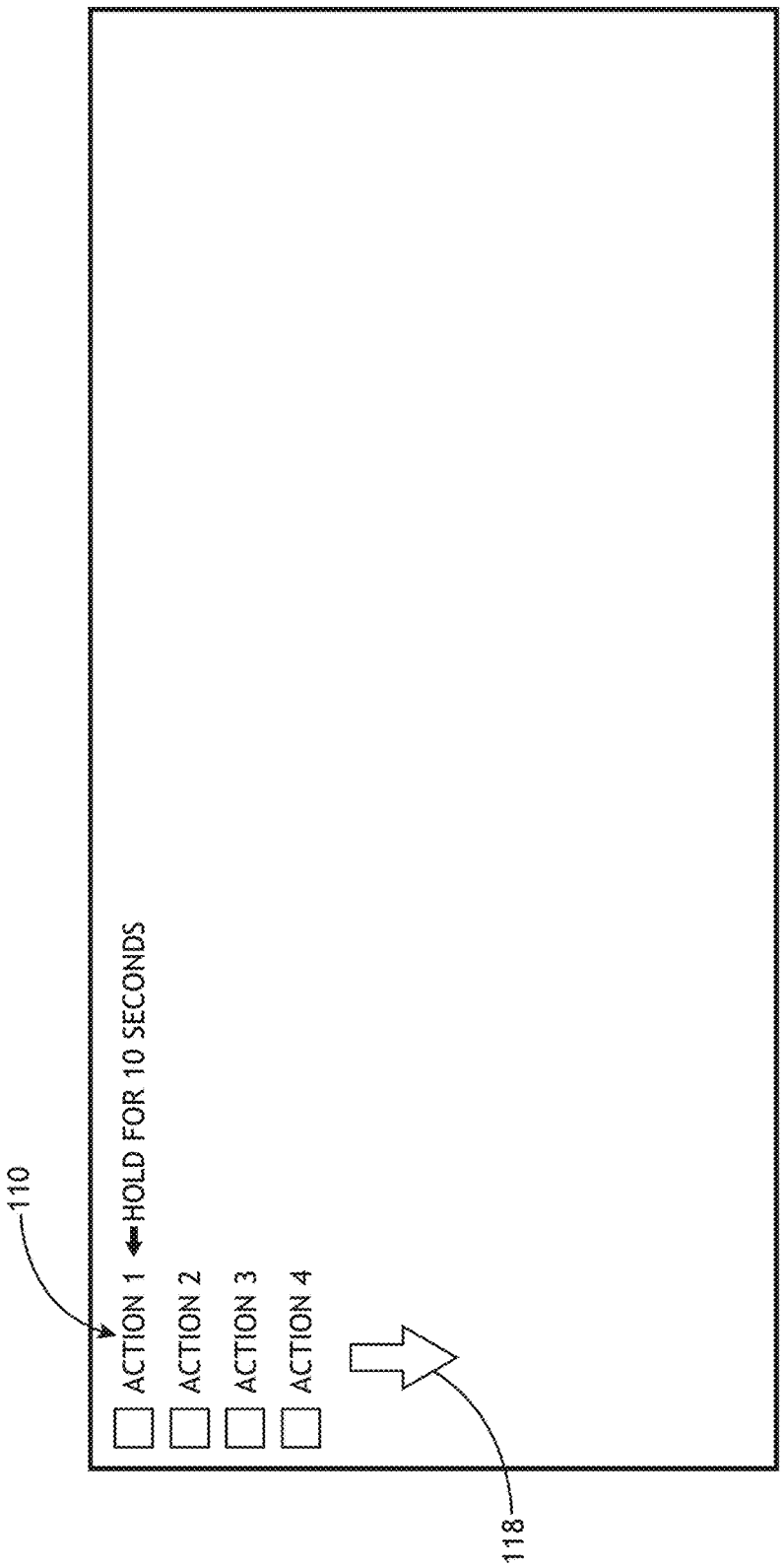
FIG. 11 is an illustration depicting an augmented reality depiction provided by the head-worn display, wherein a checklist is displayed.
Figure 12:
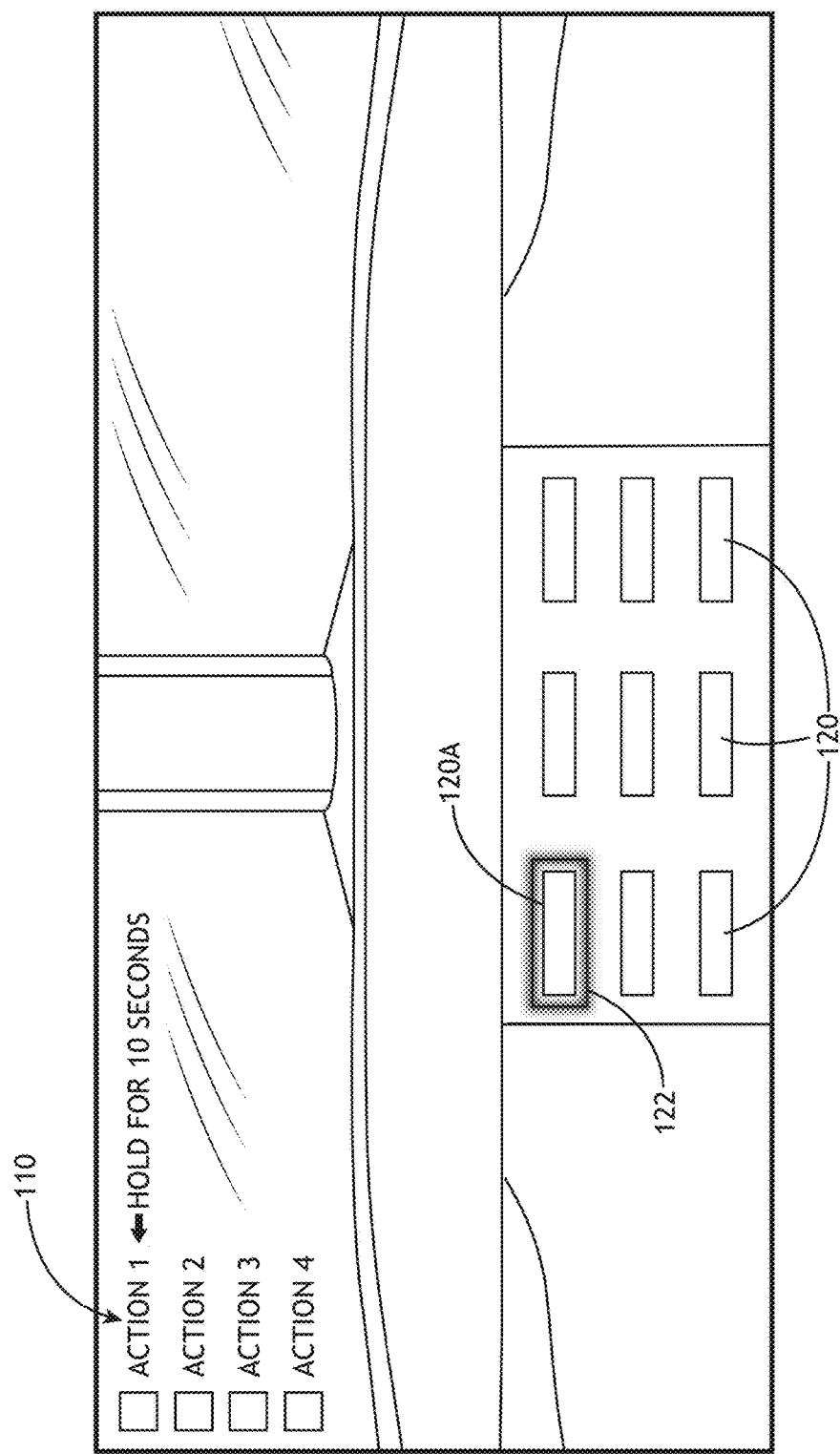
FIG. 12 is an illustration depicting an augmented reality depiction provided by the head-worn display, wherein a visual aid is displayed to help a user complete the checklist.
Figure 13:
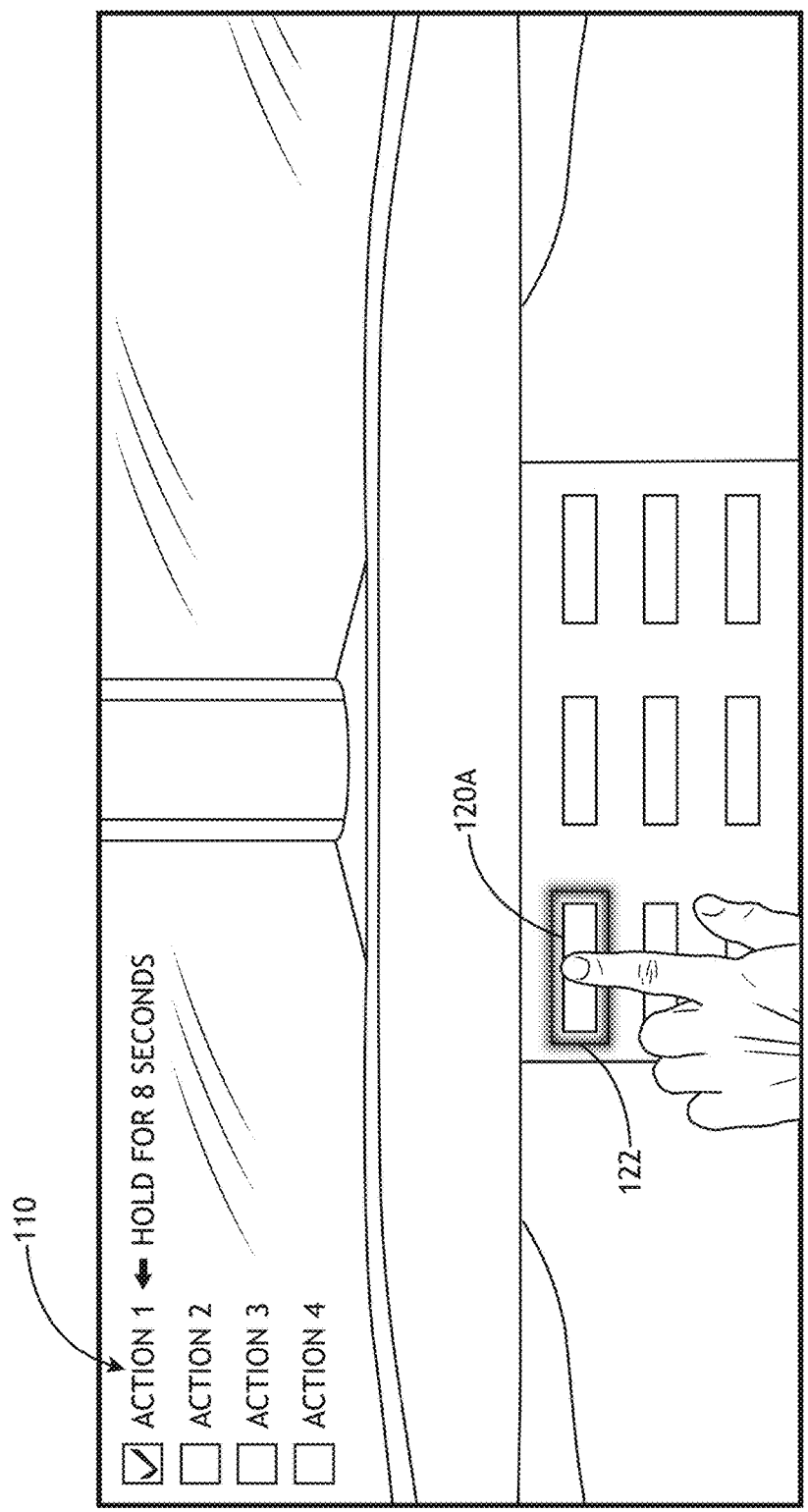
FIG. 13 is an illustration depicting an augmented reality depiction provided by the head-worn display, wherein the user uses the visual aid to complete an action specified in the checklist.

Referring now to FIGS. 11-13, a series of diagrams illustrating augmented reality depictions that may be presented to help the pilot complete a checklist 116 is shown. The checklist 116 may include, for example, a pre-flight checklist, an emergency (e.g., engine fire) checklist, as well as various other types of checklists. For illustrative purposes, suppose that the current action in the checklist 116 requires the pilot to push a button that is located outside of the field of view of the pilot, the head-worn display 100 may display an arrow 118 that points toward the location where the button is located. The pilot may follow the arrow 118 and turn toward the direction as indicated by the arrow 118, and once the button comes into the field of vision of the pilot, the head-worn display 100 may stop displaying the arrow 118.

The head-worn display 100 may subsequently identify the correct button 120A (among one or more similar buttons 120 on the flight deck) that needs to be pushed according to the action specified in the checklist 116. This may be accomplished using computer vision and/or other detection techniques. Alternatively and/or additionally, the location of the button 120A may be pre-recorded in a database, which may be utilized to help locate the button 120A when needed. Regardless of the specific implementation of the detection technique, however, once the head-worn display 100 detects the location of the button 120A, the head-worn display 100 may display a location indicator 122 around the button 120A (as shown in FIG. 12) to help the pilot correctly identify that button 120A. FIG. 13 shows the pilot pushing and holding the identified button 120A for a period of time specified in the checklist 116.

It is to be understood that the scenario depicted in FIGS. 11-13 are merely exemplary and the visual aids (the arrow 118 and the location indicator 122) depicted herein are not meant to be limiting. It is contemplated that the checklist 116, the arrow 118, and the location indicator 122 may be displayed differently than the depictions presented in the figures without departing from the broad scope of the inventive concepts disclosed herein. It is also contemplated that the head-worn display 100 may present other types of augmented reality depictions without departing from the broad scope of the inventive concepts disclosed herein.

It is noted that head-worn displays 100 configured in accordance with the inventive concepts disclosed herein may be appreciated in various operating environments, including rotary wing applications. A rotary wing aircraft often cannot install a head up display, nor would it be feasible as the rotary wing aircraft may not always traverse in a forward direction, meaning that the symbology provided by the head up display may not be conformal. Head-worn displays 100 configured in accordance with the inventive concepts disclosed herein may provide a better alternative to head up displays, with lowered cost, improved field of view, and abilities to provide stereoscopic depictions.

Figure 14:
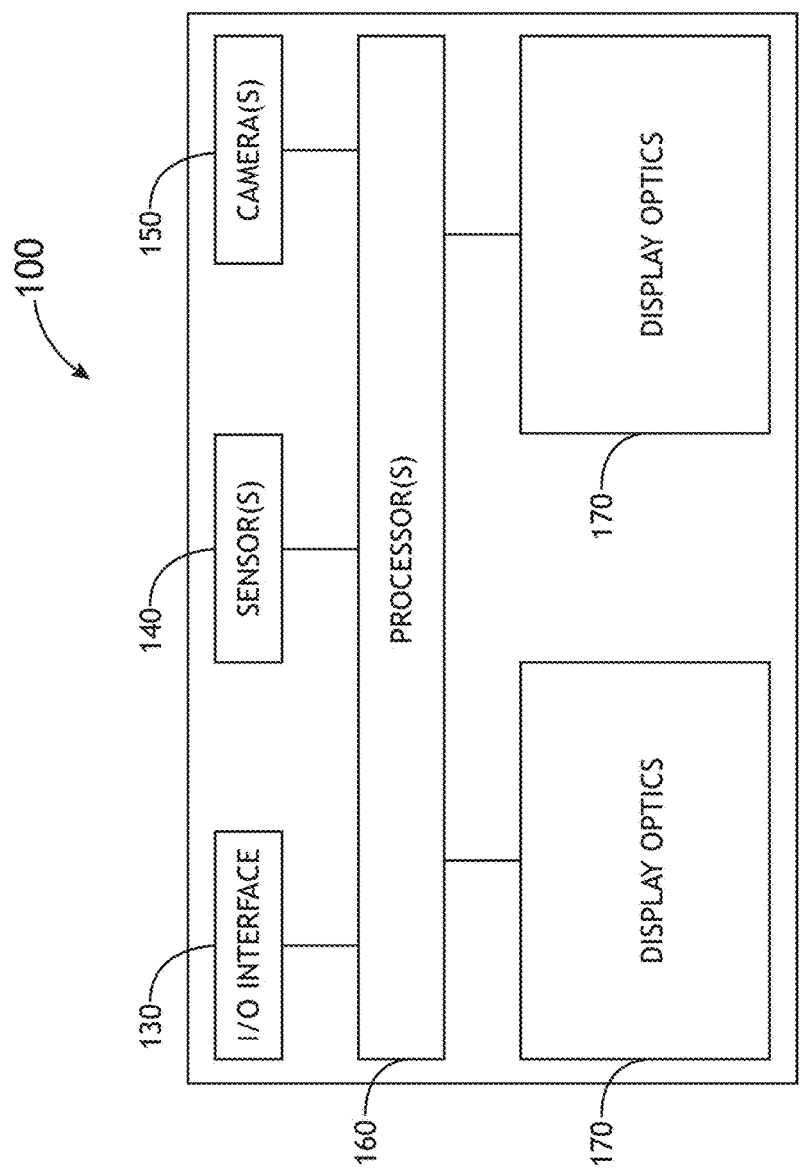
FIG. 14 is a block diagram depicting a head-worn display according to an exemplary embodiment of the inventive concepts disclosed herein.

Referring now to FIG. 14, a simplified block diagram depicting a head-worn display 100 is shown. The head-worn display 100 may include a data interface 130 configured to facilitate data communications with electronic systems and/or devices onboard an aircraft via one or more wired or wireless communication interfaces. The head-worn display 100 may also include one or more sensors 140 and/or cameras 150 configured to facilitate the various types of detection and tracking techniques previously mentioned. The head-worn display 100 may further include one or more processors 160 configured to process the data received from the data interface 130 and the one or more sensors 140 and/or cameras 150. The one or more processors 160 may be further configured to generate graphics or data input that can be used to augment the real-world environment, which may then be provided to one or more display optics 170 of the head-worn display 100 as previously described. It is contemplated that the one or more processors 160 may be implemented as dedicated processing devices, application-specific integrated circuits (ASICs), field-programmable gate arrays (FPGAs) or various other types of processors or processing devices. It is contemplated that the one or more display optics 170 may be implemented utilizing various types of two-dimensional, three-dimensional, as well as stereoscopic display technologies.

It is to be understood that the augmented reality depictions described in accordance with the inventive concepts disclosed herein are not limited to stereoscopic head-worn displays. A head-worn display that only has display optic(s) positioned in the field of view of one eye may also be configured to provide some of the augmented reality depictions described above. Furthermore, it is contemplated that the augmented reality depictions described above may be integrated into a synthetic vision system (SVS) without departing from the broad scope of the inventive concepts disclosed herein.

It is also to be understood that the specific references to aircraft and aircraft-specific functions in the examples above are merely exemplary and are not meant to be limiting. It is contemplated that head-worn displays 100 configured in accordance with the inventive concepts disclosed herein may be utilized stand-alone or onboard various types of vehicles, including airborne, land-based, and maritime vehicles, without departing from the broad scope of the inventive concepts disclosed herein.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A head-worn display, comprising:
    at least one processor configured to:
        receive eye position data from an eye tracking system;
        calibrate the head worn display based on the eye position data;
        calibrate zooming operations to determine a center point for zooming operations based on the eye position data;
        determine a location of the head-worn display with respect to a real-world environment via one or more head trackers;
        receive a position and orientation of an aircraft including the head-worn display;
        correlate the received position and orientation and the determined location of the head-worn display;
        generate a checklist and a visual aid to help the user complete the checklist;
        generate an arrow associated with the checklist indicating a real-world location of a button associated with an element of the checklist;
        generate a virtual panel rendered at a fixed virtual location;
        generate a primary flight display;
        generate a wireframe topographical map;
        generate a conformal indicator conforming to an element in the real-world environment;
        render stereoscopic images comprising the checklist, visual aid, arrow, virtual panel, primary flight display, wireframe topographical map, and conformal indicator; and
        fade out the primary flight display when an orientation of the head-worn display is directed toward the virtual panel, and fade in the primary flight display when the orientation of the head-worn display is directed away from the virtual panel; and
    at least one display in communication with the at least one processor, the at least one display configured to display the conformal indicator, virtual panel, checklist, arrow, and primary flight display generated by the at least one processor to a user via stereoscopic display optics.

2. The head-worn display of claim 1, wherein the conformal indicator is displayed at a stereoscopic depth conforming to the element in the real-world environment.

3. The head-worn display of claim 2, wherein the element in the real-world environment includes at least one of: a horizon, primary flight information, a terrain, a weather condition, a traffic, an obstacle, a flight plan, an airport, a waypoint constraint at a corresponding altitude, and a landing pad.

4. The head-worn display of claim 2, wherein the at least one processor is further configured to generate a non-conformal indicator unconstrained by elements in the real-world environment.

5. The head-worn display of claim 4, wherein the non-conformal indicator is displayed at a stereoscopic depth different from the stereoscopic depth of the conformal indicator.

6. The head-worn display of claim 4, wherein the non-conformal indicator is displayed at an adjustable stereoscopic depth.

7. The head-worn display of claim 1, wherein the at least one processor is further configured to generate a shadow to visually indicate a depth of one of the conformal indicator or the non-conformal indicator.

8. The head-worn display of claim 1, wherein the virtual panel is rendered to face the user at a predetermined viewing angle with respect to a line of sight of the user.

9. The head-worn display of claim 1, wherein the at least one processor is further configured to generate an alert displayed at varying stereoscopic depths.

10. The head-worn display of claim 1, wherein the at least one processor is further configured to generate a visual indicator of the button associated with the element of the checklist when the button enters in a field of view of the head-worn display.

11. The head-worn display of claim 1, wherein the at least one processor is further configured to calibrate the at least one display based on an eye position of the user.

12. The head-worn display of claim 1, wherein the head-worn display is adapted to operate inside a vehicle, and wherein the at least one processor of the head-worn display is further configured to process data received from at least one device located on the vehicle.

13. The head-worn display of claim 12, wherein the at least one device located on the vehicle includes a radar, and wherein the at least one processor is further configured to generate an indicator based on an object detected by the radar.

14. The head-worn display of claim 13, wherein the at least one processor is further configured to cross-reference information regarding the object detected by the radar with at least one additional sensor to improve data reliability.

15. A head-worn display, comprising:
    at least one processor configured to:
        receive eye position data from an eye tracking system;
        calibrate the head worn display based on the eye position data;
        calibrate zooming operations to determine a center point for zooming operations based on the eye position data;
        determine a location of the head-worn display with respect to a real-world environment via one or more head trackers;
        receive a position and orientation of an aircraft including the head-worn display;
        correlate the received position and orientation and the determined location of the head-worn display;
        generate a checklist and a visual aid to help the user complete the checklist;
        generate an arrow associated with the checklist indicating a real-world location of a button associated with an element of the checklist;
        generate a virtual panel rendered at a virtual location fixed in the user's field of view;
        generate a primary flight display;

receive gesture data corresponding to a hand position and gesture;

determine an interaction with the virtual panel based on an intersection of the gesture data and a portion of the virtual panel;

generate a wireframe topographical map;

generate a conformal indicator conforming to an element in the real-world environment;

render stereoscopic images comprising the checklist, visual aid, arrow, virtual panel, primary flight display, wireframe topographical map, and conformal indicator; and fade out the primary flight display when an orientation of the head-worn display is directed toward the virtual panel, and fade in the primary flight display when the orientation of the head-worn display is directed away from the virtual panel; and a stereoscopic display in communication with the at least one processor, the stereoscopic display configured to display the conformal indicator, virtual panel, and primary flight display generated by the at least one processor to a user, wherein the conformal indicator is displayed at a stereoscopic depth conforming to the element in the real-world environment.

16. The head-worn display of claim 13, wherein the at least one processor is further configured to generate a non-conformal indicator unconstrained by elements in the real-world environment, and wherein the non-conformal indicator is displayed at an adjustable stereoscopic depth.

17. A head-worn display, comprising:

at least one processor configured to:

receive eye position data from an eye tracking system;

calibrate the head worn display based on the eye position data;

calibrate zooming operations to determine a center point for zooming operations based on the eye position data;

determine a location of the head-worn display with respect to a real-world environment via one or more head trackers;

receive a position and orientation of an aircraft including the head-worn display;

correlate the received position and orientation and the determined location of the head-worn display;

generate a checklist and a visual aid to help the user complete the checklist;

generate an arrow associated with the checklist indicating a real-world location of a button associated with an element of the checklist;

generate a conformal indicator conforming to an element in the real-world environment;

generate a wireframe topographical map;

generate a non-conformal indicator unconstrained by elements in the real-world environment;

render stereoscopic images comprising the checklist, visual aid, arrow, virtual panel, primary flight display, wireframe topographical map, and conformal indicator; and fade out the conformal indicator when an orientation of the head-worn display is directed toward the non-conformal indicator, and fade in the conformal indicator when the orientation of the head-worn display is directed away from the non-conformal indicator; and a stereoscopic display in communication with the at least one processor, the stereoscopic display configured to display the conformal indicator and the non-conformal indicator generated by the at least one processor to a user, wherein the conformal indicator is displayed at a stereoscopic depth conforming to the element in the real-world environment, and wherein the non-conformal indicator is displayed at an adjustable stereoscopic depth.

* * * * *